United States Patent
Smith (10) Patent No.: US 7,178,063 B1
(45) Date of Patent: Feb. 13, 2007

(54) METHOD AND APPARATUS FOR ORDERING TEST CASES FOR REGRESSION TESTING

(75) Inventor: Zachary S. Smith, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 637 days.

(21) Appl. No.: 10/624,767

(22) Filed: Jul. 22, 2003

(51) Int. Cl.
*G06F 11/00* (2006.01)

(52) U.S. Cl. .......................................... 714/38; 717/124
(58) Field of Classification Search ................. 714/38, 714/37, 39, 25; 717/124
See application file for complete search history.

(56) References Cited

U.S. PATENT DOCUMENTS

| | | | | |
|---|---|---|---|---|
| 6,061,643 A | * | 5/2000 | Walker et al. | 702/123 |
| 6,301,701 B1 | * | 10/2001 | Walker et al. | 717/125 |
| 2001/0024489 A1 | * | 9/2001 | Jkel | 379/15.01 |
| 2003/0229825 A1 | * | 12/2003 | Barry et al. | 714/38 |
| 2003/0233600 A1 | * | 12/2003 | Hartman et al. | 714/32 |

* cited by examiner

*Primary Examiner*—Dieu-Minh Le (57) ABSTRACT

A method and apparatus for ordering test cases for regression testing in a regression test system. The regression testing may include executing ordered test cases identified and ordered according to preferences. Each prospective test case may be assigned a result record for retaining previous testing history of the specific test case as well as the design model tested. The test may be selected according to preferences that yield more timely discovery of design bugs. Once ordered, the ordered test cases may be tested against a current design model, which results in test results, at least a portion of which updates the corresponding result record.

17 Claims, 7 Drawing Sheets

FIG. 1

```
string test_case_name;
boolean waived;
boolean running;
boolean not_finished;
boolean sim_steps_is_guess;
integer sim_steps;
boolean passing;
list fast_sim_list of elements {
   integer number_instructions;
   boolean passed;
   integer bug_id;
   string model_id;
   time finish_time;
   }
list rtl_sim_list of elements {
   integer number_instructions;
   integer elapsed_minutes;
   boolean passed;
   integer bug_id;
   string model_id;
   time finish_time;
   }
```

METHOD AND APPARATUS FOR ORDERING TEST CASES FOR REGRESSION TESTING

BACKGROUND

1. Field of the Invention

The present invention relates to the field of regression testing. More particularly, the present invention relates to regression test case selection and prioritization.

2. State of the Art

In a software or hardware verification environment, a battery of tests is performed on the software or hardware under development. This battery of tests requires the generation of test cases which are periodically performed on the software or hardware undergoing development. Such a testing methodology is commonly known as "regression" testing. Generally, in a development and verification environment, a large set of regression test cases is generated and retained for analysis of design revisions or extensions. In the verification environment in which a large set of regression test cases exists, the testing of a new version of the design may require a significant amount of time in order to perform each and every one of the regression test cases.

In a complex verification environment such as an intricate hardware design, for example, a central processing unit (CPU), the large set of regression test cases is performed on multiple machines coupled together through a network having a queuing system thereon. Furthermore, as design versions become more intricate and involved, the amount of time for completing the execution of each test case on a subsequent version may also increase. When the regression test cycle for subjecting the new design version to all test cases exceeds a usable or desirable feedback time for receiving the results of the test cases, then a selection process must be employed for addressing an otherwise unacceptable feedback delay process. Therefore, there is a need for intelligently selecting preferred test cases for analyzing design model versions when execution of all possible test cases results in an unacceptable execution time.

SUMMARY

One embodiment of the invention may comprise a method of performing a regression test of ordered test cases, including assigning a result record to each of a plurality of candidate test cases, the result record including test results from testing the each of said plurality of candidate test cases against a design model, selecting the ordered test cases from the plurality of candidate test cases according to the test results in the result record of the each of the plurality of candidate test cases, testing the ordered test cases against a current design model, and updating the result record of the ordered test cases in response to new test results from the testing.

Another embodiment may comprise a computer-readable medium having computer-executable instructions for performing regression test of ordered test cases, the test including instructions for assigning a result record to each of a plurality of candidate test cases, the result record including test results from testing the each of the plurality of candidate test cases against a design model, selecting the ordered test cases from the plurality of candidate test cases according to the test results in the result record of the each of the plurality of candidate test cases, testing the ordered test cases against a current design model, and updating the result record of the ordered test cases in response to new test results from the testing.

In yet another embodiment, an ordered regression test system, comprising a test case database including a plurality of candidate test cases, each one of the plurality of candidate test cases including a result record including test results from testing the one of the plurality of test cases against a design model, a test case ordering process to select the ordered test cases from the plurality of candidate test cases according to the test results in the result record of the each of the plurality of candidate test cases, a current design model to undergo regression testing, and one or more testers for testing the ordered test case against a current design model and generating new test results to update the result record.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
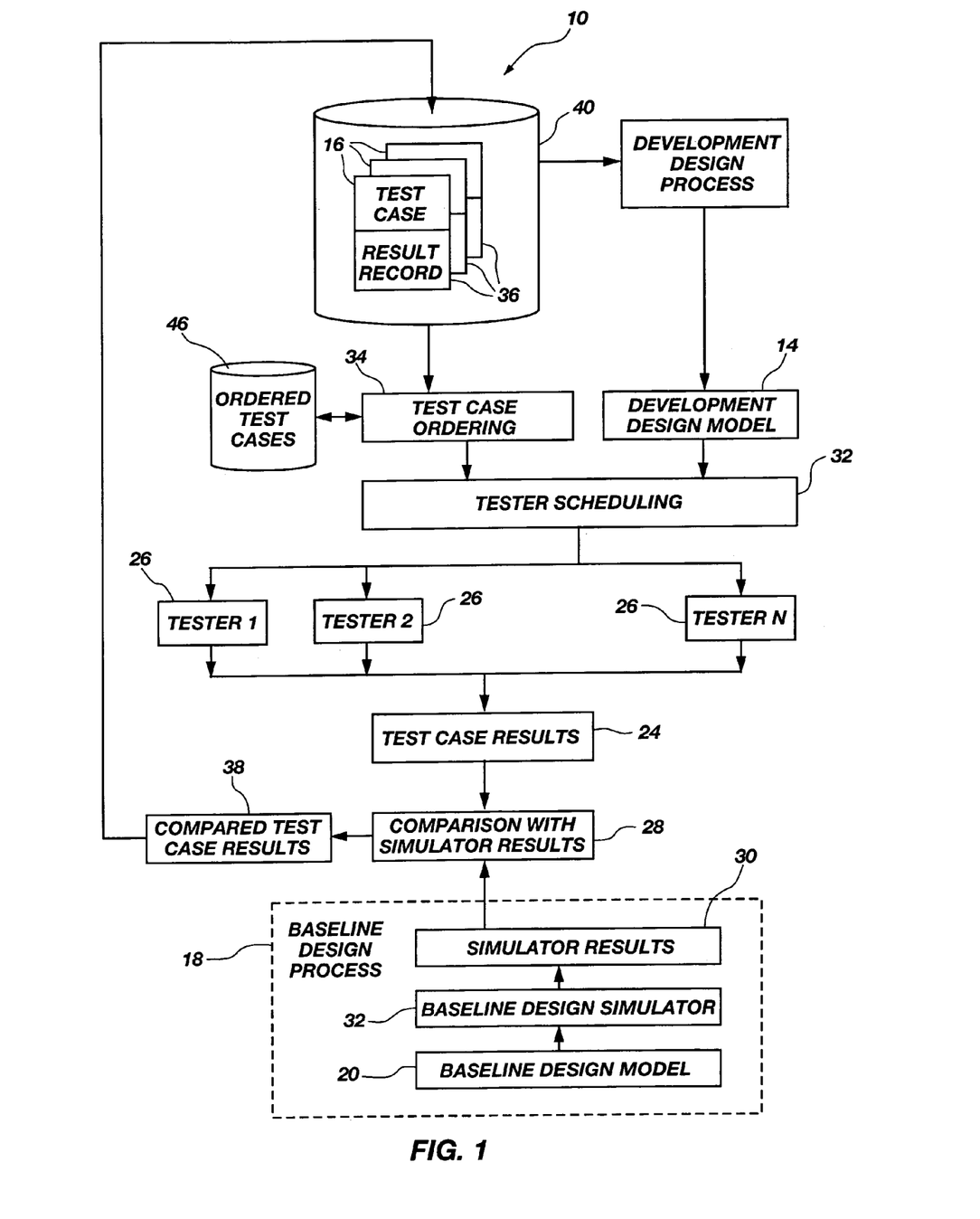
FIG. 1 is a block diagram of an ordered regression test system, in accordance with an embodiment of the present invention.

FIG. 1 is a block diagram of an ordered regression test system 10, in accordance with an embodiment of the present invention. As used herein, test systems may take the form of systems for testing either hardware designs, software designs or a combination of hardware and software designs. One exemplary hardware design application includes the development of integrated circuit designs, such as, for example, design of a central processing unit (CPU). Design development of a CPU may include the generation of millions of transistors which may be designed and simulated using design views from various levels. One such level view includes an RTL description while another view may include a separate logical simulator level view implemented as a programmed structure-based simulator.

In one embodiment of the present invention, a new design (e.g., a new CPU design) may be implemented in a development design process 12 by way of a development design model 14 using a development design language (e.g., RTL), and may have hundreds or thousands of test cases 16 for executing or "running" on the development design model 14. In order to provide a comparison baseline, the overall development process may further include a parallel baseline design process 18 that develops a baseline design model 20 using a baseline design language (e.g., a software programming language) for execution on a baseline design simulator 22, sometimes referred to as a "golden simulator." Test case results 24 from testing the development design model 14 in one or more testers 26 are compared 28 with simulator test results 30 from the baseline design model 20 as executed on the baseline design simulator 22 to determine which ones of test cases 16 identified design flaws or "bugs" in the development design model 14.

Test cases may originate from various sources and may be promulgated for years from earlier design versions. Test cases generally include various levels of sophistication and may also include varying levels of "design coverage" (i.e., testability of various functionality) over a specific design model. Additionally, in a typical complex development design model, a new or current development design model may be periodically released for verification by way of testing to determine the correctness of design. It should be appreciated that timely feedback from the test results is crucial for maintaining an efficient development process. It should also be appreciated that in complex designs, the subjection of the development design model to tens, hundreds and even thousands of test cases results in a significant testing duration as the models are simulated on a software-based tester. While the testing duration of many test cases may be reduced by distributing test cases 16 and scheduling 32 tests on a pool of testers 26, the execution of all possible test cases on a current design model often exceeds the period of releases of development design models for testing. Therefore, there is a need to provide a more efficient process for timely obtaining more significant test results, thereby minimizing development efforts that build upon identifiable design bugs. An exemplary embodiment improves the regression test methodology by providing a test case ordering process 34 for ordering test cases for regression testing of a development design model prior to initiating the regression test on a current development design model 14.

Figure 2:
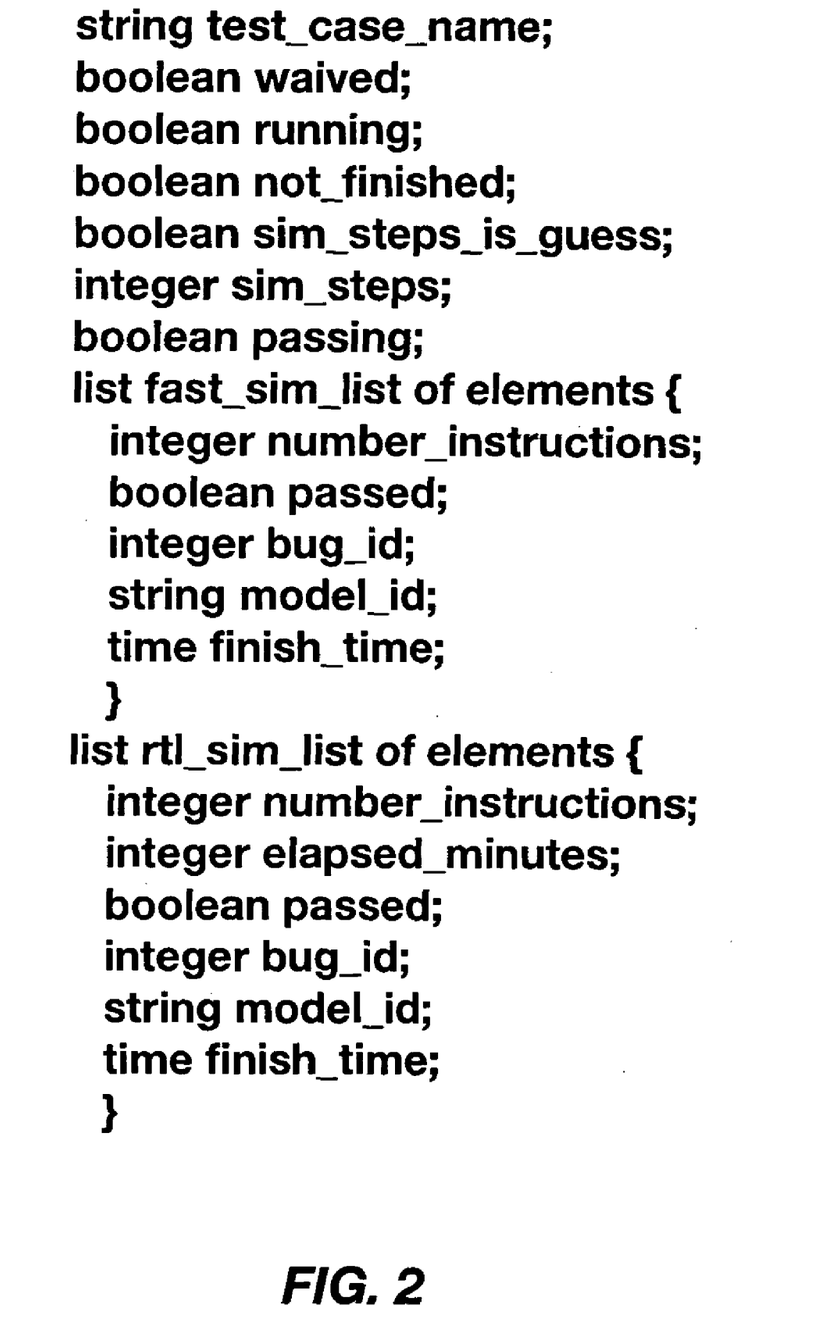
FIG. 2 is a result record for coupling with a test case, in accordance with an embodiment of the present invention.

The test case ordering process 34 utilizes a result record 36 associated with each test case for maintaining performance specifics relating to the execution of the test case on a specific development design model. FIG. 2 illustrates an exemplary result record and typical fields that may find utility in the selection and ordering process described below. The specific fields, ranges and values are illustrative, and other performance statistics are also contemplated within the scope of various embodiments of the present invention. Result records 36 contain information regarding the performance of the test case over previous runs. While FIG. 1 illustrates a one-to-one correlation of the result record to each test case, specific records of each execution of the test case on the same version of the development design model may also be maintained in another dimension of the database.

The result records 36 of FIGS. 1 and 2 are generated from test case results 24 (e.g., a test "results file") which typically includes header information identifying the name of the test case, execution time or duration, number of execution clock cycles, the ID of the specific tester 26 that performed the test, the release or version number of the development design model 14, etc. The test case results 24 may further include traces identifying instruction execution specifics including, for example, accessed memory address locations, list of opcodes and operands such as those included in an instruction trace. The test case results 24 may further include an identification of the tested coverage of the design.

The results from the testing process also undergoes a comparison against the simulator results 30 to form a pass/fail determination of the test case on the development design model 14 for inclusion within the test results, illustrated as compared test case results 38. The pertinent portions of the compared test case results 38 are then entered into corresponding portions of the result records 36, preferably stored in some readily accessible database 40. The exemplary result record of FIG. 2 illustrates various fields of importance, discussed below in relation to the corresponding ordering acts, for facilitating the test case ordering process of an embodiment of the present invention.

Figure 3:
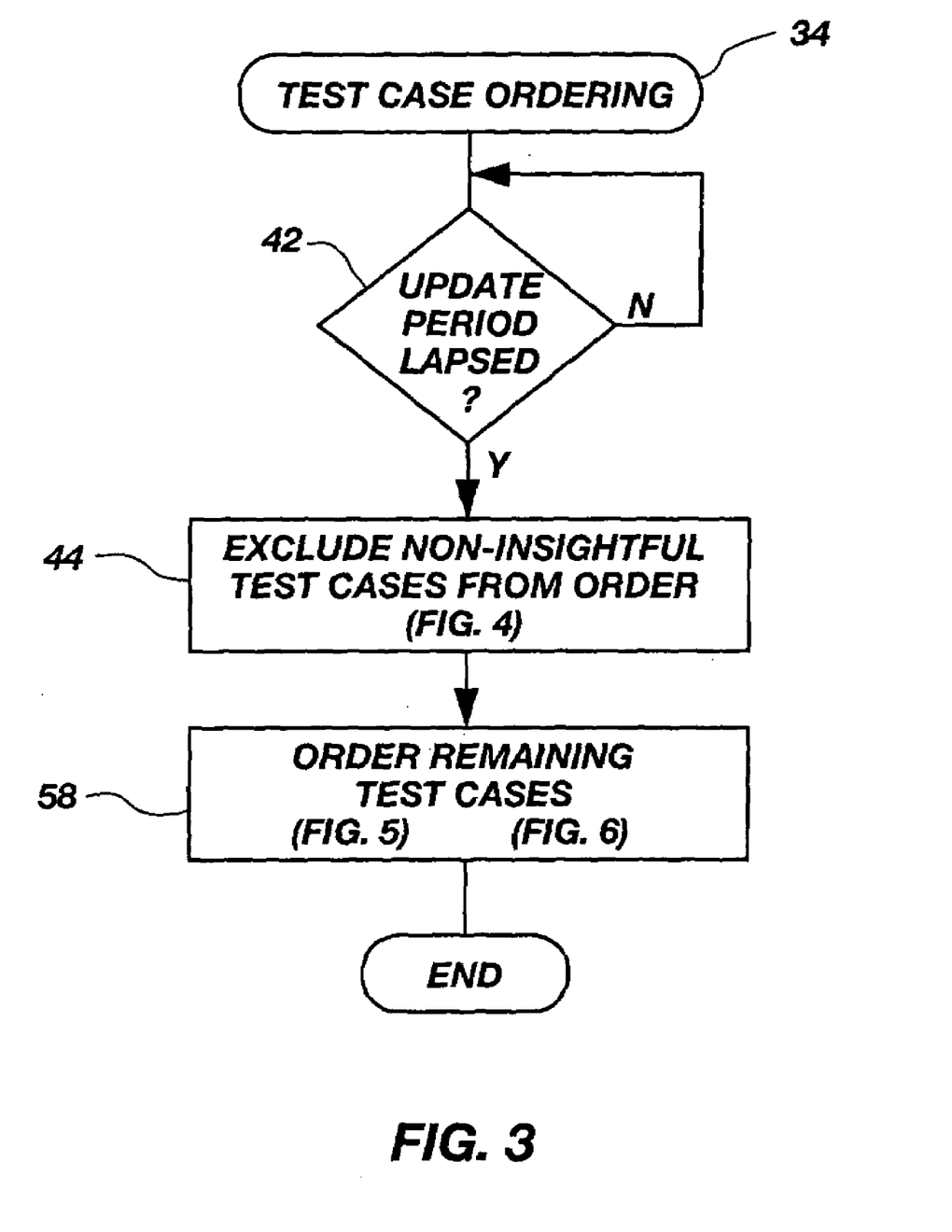
FIG. 3 is a flowchart of a test case ordering process, in accordance with an embodiment of the present invention.
Figure 4:
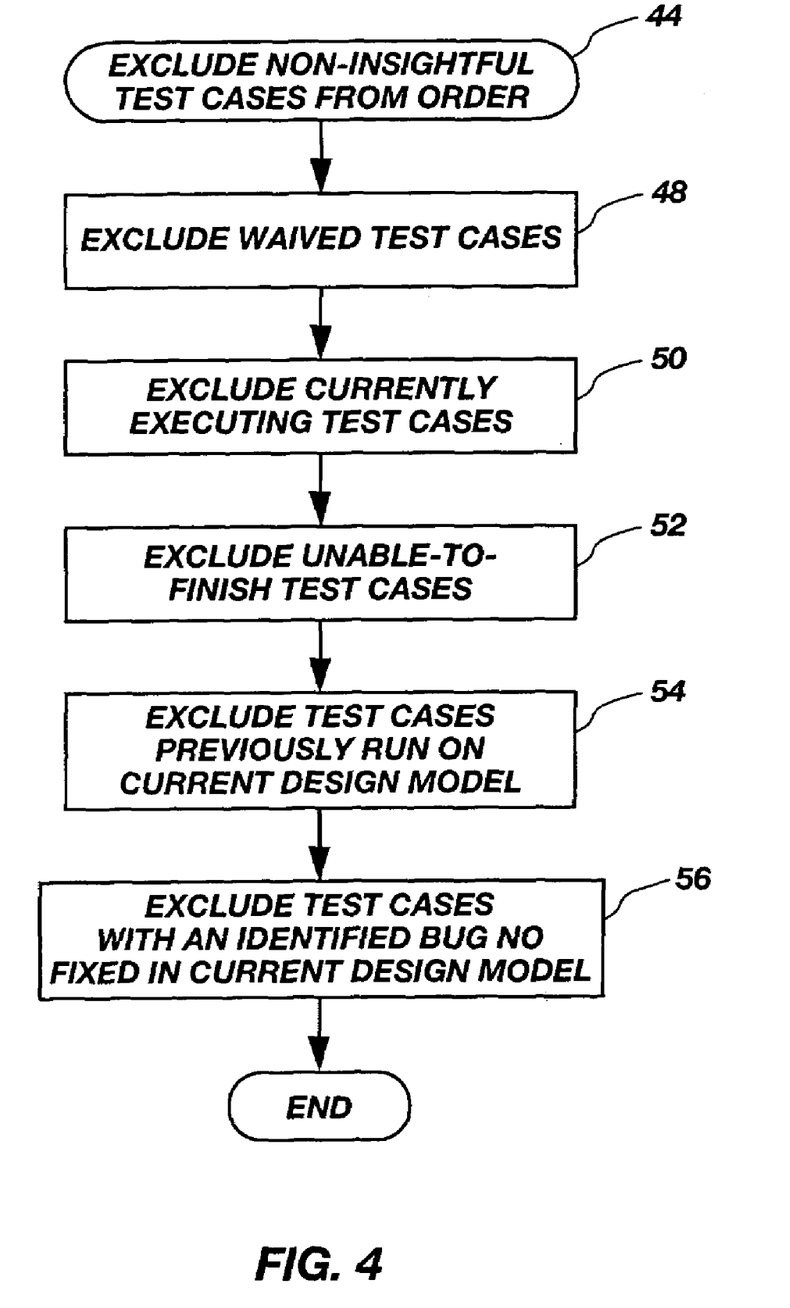
FIG. 4 is a flowchart for down-selecting portions of the available test cases, in accordance with an embodiment of the present invention.
Figure 5:
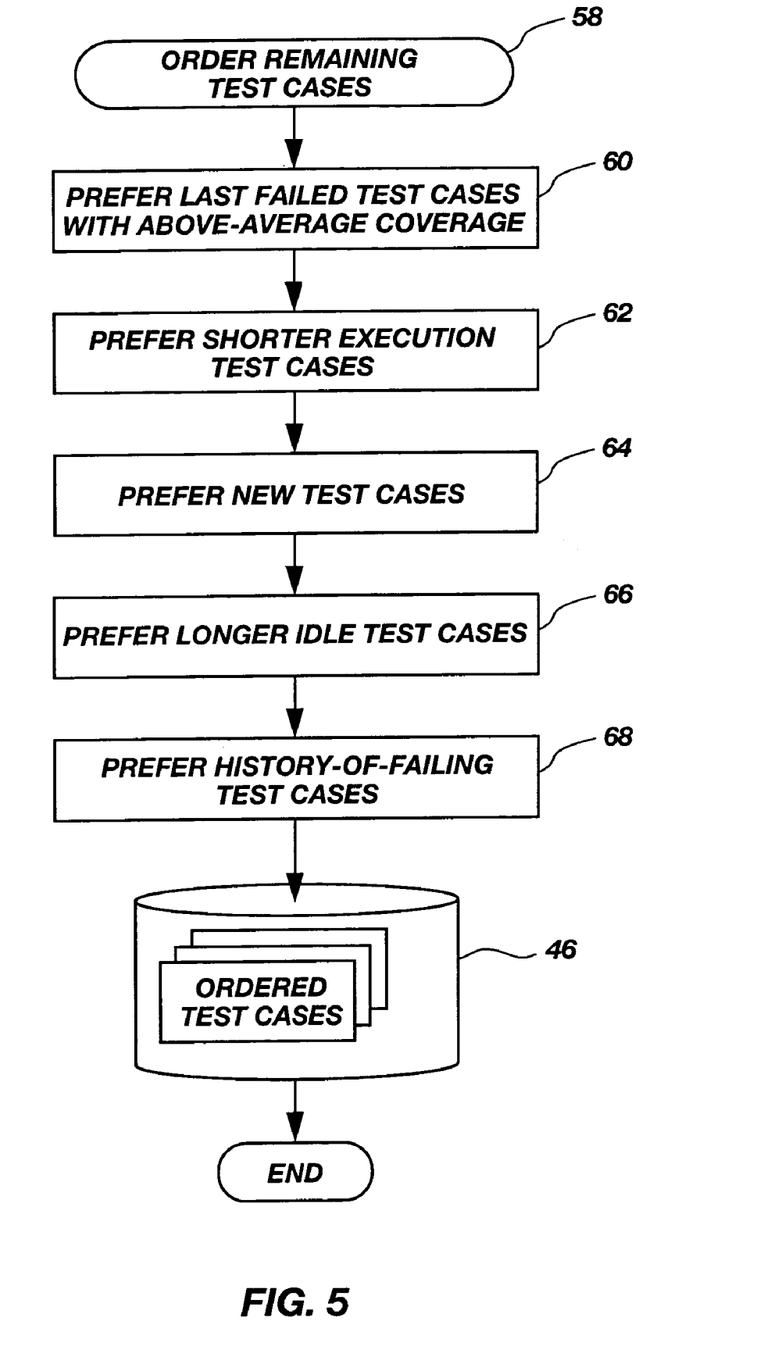
FIG. 5 is a flowchart for ordering remaining test cases according to desired relevancy, in accordance with an embodiment of the present invention.

The test case ordering process 34 of FIG. 1 is described in detail in FIG. 3, which further relies upon FIGS. 4 and 5 for providing further details. FIG. 3 is a flowchart describing the test case ordering process 34, in accordance with an embodiment of the present invention. As described above, subsequent releases of a development design model 14, a "current development design model" (FIG. 1), generally include additional functionality not previously present in earlier models. Therefore, a calculation of the ordering of test cases preferably occurs upon the release of a current development design model prior to subjecting the model to the various test cases in the various one or more testers. Additionally, another embodiment contemplates ongoing updates to the ordering of the test cases throughout the verification of a specific release version of the development design model. Referring to FIG. 3, a query 42 operates as a timer, whether time or operation based, for performing ongoing recalculation of the ordering of the test cases based upon test results of the current development design model.

Test case ordering process 34 excludes 44 lesser or noninsightful test cases from the available test cases as a step in the formation of ordered test cases 46 (FIG. 1). FIG. 4 is a flowchart illustrating types of test cases that are excluded from the ordered test cases. While the illustrative nature of FIG. 4 depicts an ordering of the exclusion acts, any physical implementation of the exclusion acts adequately results in a subset of test cases for ordering. Additionally, while FIG. 3 depicts exclusion 44 as preceding ordering 48, these acts are further capable of juxtaposition or reverse order.

Referring to FIG. 4, excluding 44 noninsightful test cases includes removing test cases from the regression test that will provide no or negligible insight relative to the functional integrity of the current development design model. The present embodiment excludes 48 test cases that have been waived (FIG. 2) for one of many possible factors, including irrelevance, inherently defective or otherwise inapplicable to the current development design model. Furthermore, the present embodiment excludes 50 test cases which are currently executing on a tester. Clearly, the re-execution of a currently executing test case on the same development design model will yield no more insightful test results than the currently executing instance of the test case. The present embodiment further excludes 52 test cases which prematurely ceased execution on a previous testing attempt. Test cases that were previously unable to complete execution are indicative of test cases that present a problem either to the tester or its available resources or of a test case that includes an inherent incompatibility with the model. Re-execution of such suspended test cases generally is fruitless and therefore wastes testing resources and delays more pertinent feedback of test results to the development design process 12 (FIG. 1). Furthermore, the present embodiment excludes 54 test cases previously run on the current version of the development design model. Clearly, re-execution of the same test case on the same version of a model could only yield redundant test case results. Finally, the present embodiment excludes 56 test cases that previously failed as a result of a bug that has been identified but whose remedy or "fix" has not been addressed in the current revision of the development design model. The rationale for this exclusion is that any test case run on a previous version of the model that has not had the fix for that bug implemented in the current model will yield the same test case result due to the lingering nature of the bug. Utilization of test resources for reiterating a test case result yields only wasted resources and a redundant test case result.

Returning to FIG. 3, once the less or noninsightful test cases have been excluded 44 from the candidate of test cases, the remaining test cases are ordered 58 via ordering criteria that postures more insightful test cases ahead of lesser insightful cases. It is reiterated that extensive regression testing typically results in extensive testing durations which, if not managed and prioritized, result in late-arriving feedback that may be of significant interest. Therefore, it is desirable to obtain test case results of greater gravity and interest earlier in the regression testing process.

The test case ordering 58 is further detailed with reference to FIG. 5 wherein preferential ordering places certain test cases in a preferred execution order, thereby making certain test case results available in a more timely manner. While FIG. 5 depicts an ordering of specific preferring acts, such aggregation is illustrative only. In one embodiment, the ordering of remaining test cases process 58 prefers 60 test cases that have previously failed. By preferring previously failed test cases, this embodiment of the present invention subjects the current development design model to test cases that present the greatest opportunity for discovering yet an additional bug in the current version of the model. The rationale is that if a bug was found and fixed, then there is a likelihood that some aspects of the test case may have never been fully exercised on a model because of the discovery of the earlier bug. Also, by preferring test cases that provide above-average test coverage, a greater portion of the model is tested than would otherwise be tested in a nonordered bulk regression test. Furthermore, the present embodiment prefers 62 shorter-execution test cases over longer-execution test cases.

While the execution duration of a particular test case may be readily attainable for a subsequent ordering process once a test case has been executed, methods are contemplated for the estimation of the execution length of a test case that has not been previously executed. For example, development processes frequently utilize additional models for analyzing other aspects of a design. In the case of an execution-unit design, such as a CPU, models are frequently generated for execution on a "fast simulator" designed as an architectural simulator (e.g., an in-order instruction executor) which is capable of testing corresponding microcode or other software execution aspects of the design. In such cases, a scaling factor determined from a separate previously executed test case and its corresponding microcode test model may be derived. The scaling factor may then be applied to the unexecuted test case for determination of an approximate testing duration. The previously unexecuted test case may then be preferred 62 based upon its execution duration. Execution of lengthy test cases may result in an overdedication of testing resources for the amount of insightful test case results obtained. Shorter test cases may be designed for specific testing functionality testing purpose whereas longer test cases generally perform a broader-based execution function.

In another ordering aspect of the ordering remaining test case process 58, test cases that have never been previously executed are preferred 64. A fresh test case presents an enhanced opportunity to identify a possible design bug or to verify correct operational behavior of the design. Additionally, the present embodiment prefers 66 test cases which have been idle longer, either through receiving less priority or otherwise. This preferential step assures that test cases do not indefinitely continue to be less preferred. This preference encourages the testing with test cases that may have been executed on an older version of the model but now may be tested on a model that likely includes more significant changes in functionality. It is important that all test cases be allowed to identify the design quality for which they were developed. The present embodiment further prefers 68 test cases which have a history of failing but that did not fail last time over test cases that regularly pass. With this preference, the objective is to attempt to re-fail the current model as opposed to continuing to re-pass a likely bug-free portion of the design.

Figure 6:
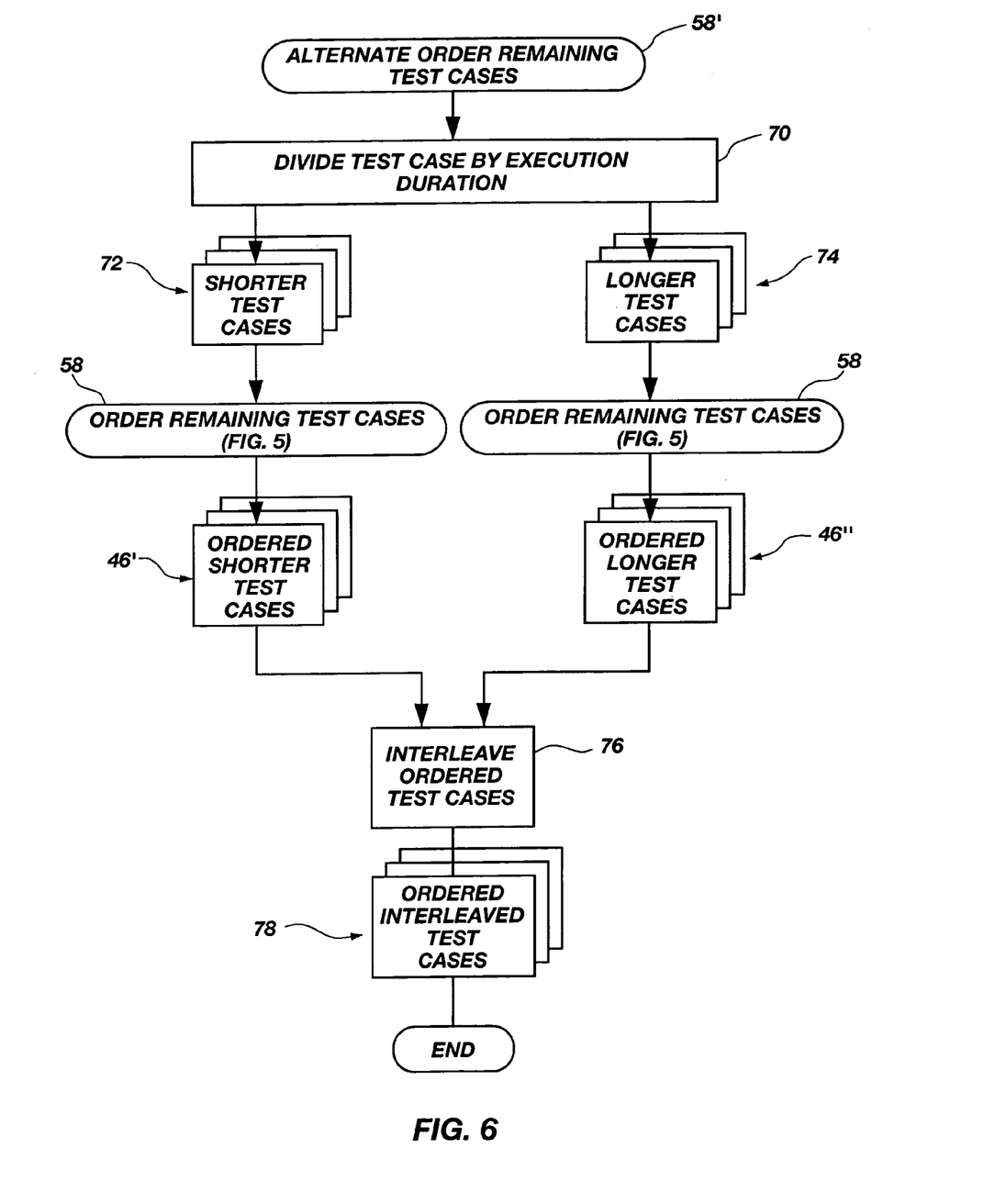
FIG. 6 is a flowchart for alternatively ordering remaining test cases according to desired relevancy, in accordance with another embodiment of the present invention.

FIG. 6 illustrates an ordering test cases process, in accordance with another embodiment of the present invention. The present embodiment appreciates that certain test case characteristics may warrant specific partitioning so as to not overly discriminate against a specific characteristic, thus resulting in a class of test cases that is infrequently exercised. By way of example and not limitation, FIG. 6 illustrates one such characteristic, namely, the execution length of a test case. In the present embodiment, test cases are ordered 58' by dividing 70 test cases according to an identified characteristic. In the present exemplary embodiment, the characteristic, execution duration of the test case, is used to partition the remaining test cases into bins, illustrated as shorter-execution duration test cases 72 and longer-execution duration test cases 74. The partitioned bins of test cases 72, 74 then individually undergo the ordering process 58 as described in FIG. 5, namely, the preferring acts resulting in corresponding ordered bins of shorter-execution duration ordered test cases 46' and longer-execution duration ordered test cases 46". Thereafter, shorter-execution duration test cases 46' and longer-execution duration ordered test cases 46" may undergo a combinatory process, one of which is illustrated as interleaving 76, resulting in ordered interleaved test cases 78. Other combinatory processes are contemplated and are appreciated by those of ordinary skill in the art.

Figure 7:
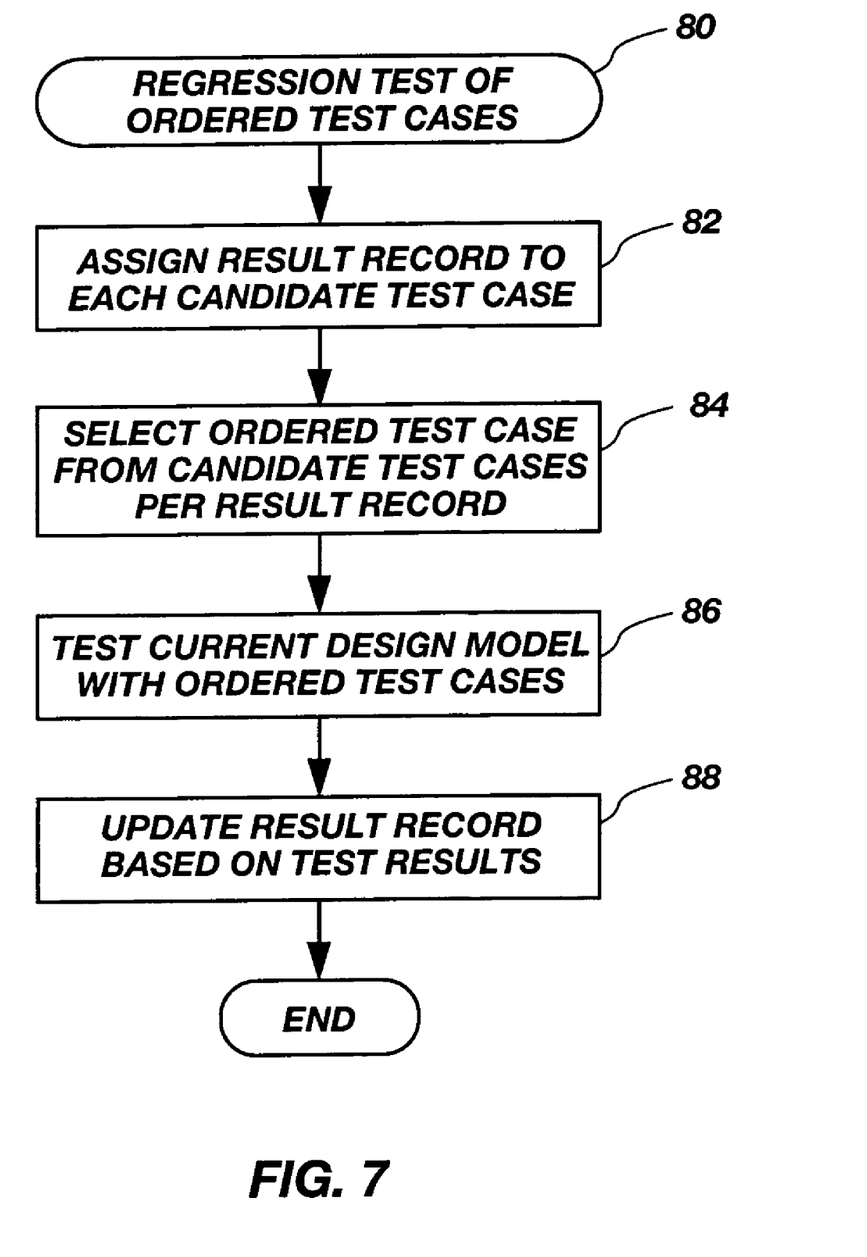
FIG. 7 is a flowchart of a method of performing a regression test in accordance with an embodiment of the present invention.

FIG. 7 illustrates another embodiment of a method of performing a regression test of ordered test cases. A method 80 assigns 82 a result record to each of a plurality of candidate test cases. The result records include test results from testing each of the plurality of candidate test cases against a design model. The method selects 84 ordered test cases from the plurality of candidate test cases according to the test results in the result record of each of the plurality of candidate test cases. The regression testing continues by testing 86 the ordered test cases against a current design model and updates 88 the result record of the ordered test cases in response to new test results from the testing.

A method and system for performing a regression test in a manner that improves performance efficiency over a traditional bulk mode regression testing approach has been presented. The method and system cull noninsightful test cases from the available test cases and then proceed to order the remaining test cases according to preferences that present a greater propensity for identifying defects (e.g., bugs) in a newer version of the development design model.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of performing a regression test of ordered test cases, comprising:
    assigning a result record to each of a plurality of candidate test cases, said result record including test results from testing said each of said plurality of candidate test cases against a design model;
    selecting said ordered test cases from said plurality of candidate test cases according to said test results in said result record of said each of said plurality of candidate test cases,
        wherein said selecting said ordered test cases comprises:
        excluding noninsightful ones of said plurality of candidate test cases from said ordered test cases; and
    preferentially ordering remaining ones of said plurality of candidate test cases to form ordered test cases comprises:
        dividing said remaining ones of said plurality of candidate test cases into shorter execution ones and longer execution ones;
        separately ordering said shorter execution ones into shorter-execution ordered test cases and said longer execution ones into longer-execution ordered test cases; and
        interleaving said shorter-execution ordered test cases and said longer-execution ordered test cases to form ordered test cases;
    testing said ordered test cases against a current design model; and
    updating said result record of each of said ordered test cases in response to new test results from said testing.

2. The method of claim 1, wherein said excluding comprises excluding one or more of said plurality of candidate test cases when said result record specifies at least one of test case waived, test case currently executing, test case unable to complete previous execution attempt, test case previously executed on current design model, and previously identified bug detected in said test case not fixed in current design model.

3. The method of claim 1, wherein preferentially ordering includes preferring ones of said remaining ones of said plurality of candidate test cases having above-average coverage of said current design model.

4. The method of claim 1, wherein preferentially ordering further includes preferring ones of said remaining ones of said plurality of candidate test cases having shorter testing duration on said design model.

5. The method of claim 1, wherein preferentially ordering further includes preferring not previously executed ones of said remaining ones of said plurality of candidate test cases.

6. The method of claim 1, wherein preferentially ordering further includes preferring ones of said remaining ones of said plurality of candidate test cases having longer idle durations.

7. The method of claim 1, wherein preferentially ordering further includes preferring ones of said remaining ones of said plurality of candidate test cases having greater failing histories.

8. A computer-readable medium having computer-executable instructions for performing regression test of ordered test cases, said test comprising instructions for:
    assigning a result record to each of a plurality of candidate test cases, said result record including test results from testing said each of said plurality of candidate test cases against a design model;
    selecting said ordered test cases from said plurality of candidate test cases according to said test results in said result record of said each of said plurality of candidate test cases, comprises:
        excluding noninsightful ones of said plurality of candidate test cases from said ordered test cases; and
        preferentially ordering remaining ones of said plurality of test cases to form ordered test cases, wherein said preferentially ordering comprises:
            dividing said remaining ones of said plurality of test cases into shorter execution ones and longer execution ones;
            separately ordering said shorter execution ones into shorter-execution ordered test cases and said longer execution ones into longer-execution ordered test cases; and
            interleaving said shorter-execution ordered test cases and said longer-execution test cases to form ordered test cases;
    testing said ordered test cases against a current design model; and
    updating said result record of said ordered test cases in response to new test results from said testing.

9. The computer-readable medium of claim 8, wherein said computer-executable instructions for excluding comprise computer-executable instructions for excluding one or more of said plurality of candidate test cases when said result record specifies at least one of test case waived, test case currently executing, test case unable to complete previous execution attempt, test case previously executed on current design model, and previously identified bug detected in said test case not fixed in current design model.

10. The computer-readable medium of claim 8, wherein said computer-executable instructions for preferentially ordering further comprise computer-executable instructions for preferring ones of said remaining ones of said plurality of test cases having above-average coverage of said current design model.

11. The computer-readable medium of claim 8, wherein said computer-executable instructions for preferentially ordering further comprise computer-executable instructions for preferring ones of said remaining ones of said plurality of test cases having shorter testing duration on said design model.

12. The computer-readable medium of claim 8, wherein said computer-executable instructions for preferentially ordering further comprise computer-executable instructions for preferring not previously executed ones of said remaining ones of said plurality of test cases.

13. The computer-readable medium of claim 8, wherein said computer-executable instructions for preferentially ordering further comprise computer-executable instructions for preferring ones of said remaining ones of said plurality of test cases having longer idle durations.

14. The computer-readable medium of claim 8, wherein said computer-executable instructions for preferentially ordering further comprise computer-executable instructions for preferring ones of said remaining ones of said plurality of test cases having greater failing histories.

15. An ordered regression test system, comprising:
   a test case database including a plurality of candidate test cases, each one of said plurality of candidate test cases including a result record including test results from testing said one of said plurality of test cases against a design model;
   a test case ordering process to select said ordered test cases from said plurality of candidate test cases according to said test results in said result record of said each of said plurality of candidate test cases comprises:
      excluding noninsightful ones of said plurality of candidate test cases from said ordered test cases; and
      preferentially ordering remaining ones of said plurality of candidate test cases to form ordered test cases comprises:
         dividing said remaining ones of said plurality of candidate test cases into shorter execution ones and longer execution ones;
         separately ordering said shorter execution ones into shorter-execution ordered test cases and said longer execution ones into longer-execution ordered test cases; and
      interleaving said shorter-execution ordered test cases and said longer-execution ordered test cases to form ordered test cases;
   a current design model to undergo regression testing; and
   one or more testers for testing said ordered test cases against a current design model and generating new test results to update said result record.

16. The ordered regression test system of claim 15, further comprising a tester scheduling process operably coupled between said test case ordering process and said one or more testers, said tester scheduling process configured to distribute portions of said ordered test cases for execution among said one or more testers.

17. An ordered regression test system, comprising:
   means for assigning a result record to each of a plurality of candidate test cases, said result record including test results from testing said each of said plurality of candidate test cases against a design model;
   means for selecting said ordered test cases from said plurality of candidate test cases according to said test results in said result record of said each of said plurality of candidate test cases, wherein said means for selecting said ordered test cases comprises:
      means for excluding noninsightful ones of said plurality of candidate test cases from said ordered test cases; and
      means for preferentially ordering remaining ones of said plurality of candidate test cases to form ordered test cases comprises:
         means for dividing said remaining ones of said plurality of candidate test cases into shorter execution ones and longer execution ones:
         means for separately ordering said shorter execution ones into shorter-execution ordered test cases and said longer execution ones into longer-execution ordered test cases; and
   means for interleaving said shorter-execution ordered test cases and said longer-execution ordered test cases to form ordered test cases;
   means for testing said ordered test cases against a current design model; and
   means for updating said result record of said ordered test cases in response to new test results from said testing.

* * * * *

UNITED STATES PATENT AND TRADEMARK OFFICE
CERTIFICATE OF CORRECTION

PATENT NO. : 7,178,063 B1
APPLICATION NO. : 10/624767
DATED : February 13, 2007
INVENTOR(S) : Zachary S. Smith It is certified that error appears in the above-identified patent and that said Letters Patent is hereby corrected as shown below:

On the Title page, Item (57), under "Abstract", in column 2, line 7, after "test" insert -- cases --.

In column 10, line 22, in Claim 17, after "ones" delete ":" and insert -- ; --, therefor.

Signed and Sealed this

Eleventh Day of November, 2008

JON W. DUDAS
*Director of the United States Patent and Trademark Office*